United States Patent
Dixon et al.

(10) Patent No.: US 9,450,906 B2
(45) Date of Patent: Sep. 20, 2016

(54) MANAGING A MESSAGING QUEUE IN AN ASYNCHRONOUS MESSAGING SYSTEM

(71) Applicant: INTERNATIONAL BUSINESS MACHINES CORPORATION, Armonk, NY (US)

(72) Inventors: Bret W. Dixon, South Perth (AU); Scot Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 14/074,936

(22) Filed: Nov. 8, 2013

(65) Prior Publication Data

US 2015/0134747 A1 May 14, 2015

(51) Int. Cl.
*G06F 15/16* (2006.01)
*H04L 12/58* (2006.01)

(52) U.S. Cl.
CPC ........................... *H04L 51/26* (2013.01)

(58) Field of Classification Search
CPC .................................................. H04L 51/046
See application file for complete search history.

(56) References Cited

U.S. PATENT DOCUMENTS

| 8,196,151 | B1* | 6/2012 | Leonard | G06F 3/00 719/314 |
| 8,266,290 | B2 | 9/2012 | Calder et al. | |
| 8,549,540 | B1* | 10/2013 | Dixon | G06F 9/546 719/314 |
| 2005/0060374 | A1 | 3/2005 | Phillips | |
| 2009/0307393 | A1 | 12/2009 | Hasti et al. | |
| 2010/0008377 | A1* | 1/2010 | Hasti | H04L 12/5693 370/412 |

OTHER PUBLICATIONS

J. Ramon Coz Fernandez et al., "A Domain Engineering Approach to Increase Productivity in the Development of a Service for Changes Notification of the Configuration Management Database", Journal of Software Engineering and Applications, 2013, No. 6, pp. 207-220.

\* cited by examiner

*Primary Examiner* — Moustafa M Meky
*Assistant Examiner* — Thorne E Waugh
(74) *Attorney, Agent, or Firm* — Law Office of Jim Boice

(57) ABSTRACT

A computer implemented method, system and/or computer program product is provided for managing a messaging queue in an asynchronous messaging system. A duration for which a message can remain on the messaging queue is determined. An age of the message on the messaging queue is monitored. The age of the message on the messaging queue and the determined duration is compared and a notification is generated based on the comparison.

15 Claims, 3 Drawing Sheets

MANAGING A MESSAGING QUEUE IN AN ASYNCHRONOUS MESSAGING SYSTEM

BACKGROUND

The present invention relates to in general to message oriented middleware (MOM), and more particularly to managing messaging queues in asynchronous messaging system.

In recent years, the ability of application programs to communicate with each other or with system provided services in a computer system or network without having to become involved in the complexities of particular operating systems or communication protocols has been much enhanced by the development of Message Oriented Middleware (MOM). This is a software providing a common programming interface by means of which applications can communicate with other applications without specific knowledge of the different operating systems and/or protocols which may be used by those applications.

One example of Message Oriented Middleware is the IBM WebSphere MQ product family ("IBM" and "WebSphere" are trademarks of International Business Machines Corporation). WebSphere MQ and other MOM products employ message queuing which allows programs to send and receive application specific data or messages to each other. Without having a private, dedicated logical connection established between them. Instead, messages containing the application specific data are placed on messaging queues by a queue manager local to the application. These queues may be accessed directly by applications on the same system using the same queue manager or their contents may be transmitted over a network or multi node system and placed on respective associated queues accessible to a receiving application via its respective local queue manager. In order to transmit messages to remote applications, the originating queue manager must establish a communication channel to the remote queue manager. Both transmission and accessing of queued messages take place asynchronously. Applications communicate with their associated queue managers via a standard application programming interface (API), known as the Message Queuing Interface (MQI) in the case of WebSphere MQ. Specific API commands cause the queue manager to store (PUT) messages on named destination queues, either directly, if local, or by transmitting them to the appropriate queue manager at a node elsewhere in the system and also to retrieve (GET) stored messages from such queues.

Messages placed on a queue may build up if they are not consumed quickly enough, or they may remain on a queue if no application runs to consume them. Both of these cases may be symptomatic of a problem in the message queuing environment. There is a need to address this.

SUMMARY

A computer implemented method, system and/or computer program product is provided for managing a messaging queue in an asynchronous messaging system. A duration for which a message can remain on the messaging queue is determined. An age of the message on the messaging queue is monitored. The age of the message on the messaging queue and the determined duration is compared and a notification is generated based on the comparison.

DETAILED DESCRIPTION

Figure 1:
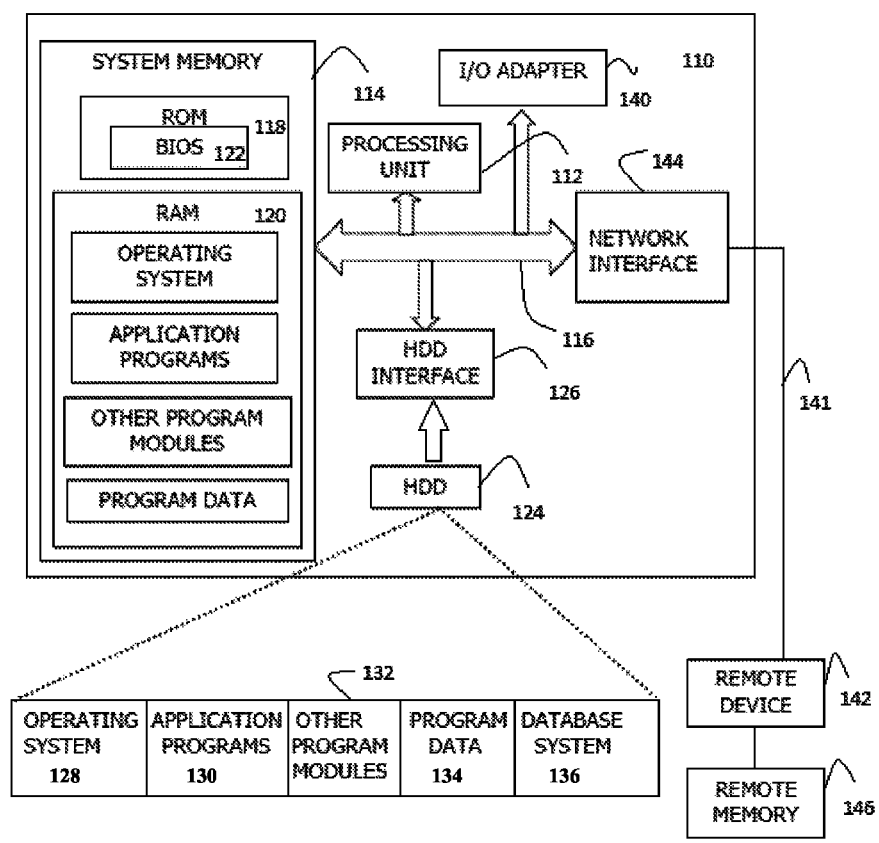
FIG. 1 illustrates a block diagram of a computing system for implementing embodiments of the present invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware embodiments that may all generally be referred to herein as a "circuit," "module" or "system." Furthermore, embodiments of the present invention may take the form of a computer program product, embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a block diagram of a computing system for implementing an embodiment of the present invention. The computing system includes a computing device 110, which in turn includes a processing unit 112, a system memory 114, and a system bus 116 that couples various system components including the system memory 114 to the processing unit 112. The system bus 116 may be any of several types of bus architectures, including a memory bus, a memory controller, a peripheral bus, and a local bus using any of a variety of bus architectures, such as PCI. The system memory 114 can include a Read Only Memory (ROM) 118 and a Random Access Memory (RAM) 120. A Basic Input/Output System (BIOS) 122, containing the basic routines that help to transfer information between elements within the computing device 110, such as during start-up, is stored in the ROM 118. The computing device 110 further includes a Hard Disk Drive (HDD) 124 as computer-readable storage media. The HDD 124 is connected to the system bus 116 by an HDD interface 126. The HDD 124 provides a non-volatile storage for computer-readable instructions, data structures, program modules, and other data for the computing device 110. Although the exemplary environment described herein employs the HDD 124, it should be appreciated by those skilled in the art that other types of computer-readable storage media, which can store data that is accessible by computer, such as RAM, ROM, removable magnetic disks, removable optical disks, and the like may also be used in the exemplary operating environment.

A number of program modules may be stored on the HDD 124, including an operating system 128, one or more application programs 130, other program modules 132, program data 134, and a database system 136. The operating system 128, the one or more application programs 130, the other program modules 132 and program data 134 may be loaded onto the system memory 114 and specifically onto the RAM 120 during the functioning of the computing device 110. A user may provide commands and information through input devices, such as a keyboard, and receive output through peripheral output devices, such as monitor, speaker, printer, etc. (not shown). These input and output devices are often connected to the processing unit 112 through an I/O adapter 140 coupled to the system bus 116.

In a networked environment, the computing device 110 may be connected to a remote computing device 142 through a network interface card 144. It will be appreciated that the network connections shown are exemplary, and any conventional means 141 of establishing communications links between the computers, such as a local area network, wide area network or wireless connection, may be used. In a networked environment, program modules depicted relative to the computing device 110, or its components, may be stored in a remote memory 146. The remote computing device 142 may be a personal computer, a router, a server, a network PC, a peer device, or other common network device.

Those of the ordinary skill in the art will appreciate that the hardware in FIG. 1 is a basic computing system and may vary. The architecture of the aforementioned computing device is not limiting and is only depicted as an example on which an embodiment of the present invention may be implemented. Other types of computing system such as a smart phone or a web-kiosk are well within the intended scope on which an embodiment of the present invention may be implemented.

Figure 2:
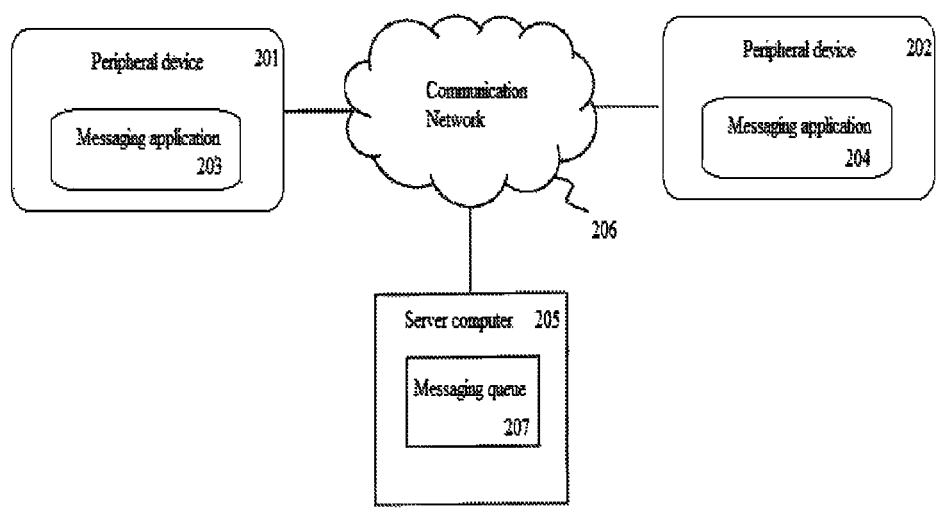
FIG. 2 illustrates a block diagram of a system for implementing embodiments of the present invention.

FIG. 2 illustrates a block diagram of a system for implementing an embodiment of the present invention. The system includes a first 201 and second 202 peripheral devices, respectively hosting the messaging applications 203 and 204 for sending and receiving messages. Each peripheral device 201 and 202 may be implemented using a general-purpose computer device as shown in FIG. 1 executing a computer program for carrying out the processes described herein. The peripheral devices 201 and 202 may be a personal computer (e.g., a laptop, a personal digital assistant) or a host attached terminal. The system may include many more peripheral devices and is not limited to peripheral devices. The peripheral devices 201 and 202 are not limited to being personal computers and may be any device capable of creating a message to be transferred to another device. Further examples of such devices include sensors that report data.

The first and second peripheral devices, 201 and 202, respectively, are coupled to each other and to a server computer 205 via a communication network 206. The communication network 206 may be any type of known network including, but not limited to, a wide area network (WAN), a public switched telephone network (PSTN) a local area network (LAN), a global network (e.g. Internet), a virtual private network (VPN), and an intranet. The communications network may be implemented using a wireless network or any kind of physical network implementation known in the art. Peripheral devices 201 and 202 and may be coupled to the server computer 205 through multiple networks (e.g., intranet and Internet) so that not all user systems are coupled to the host systems through the same network. One or more user systems and the server computer 205 may be connected to the communication network 206 in a wireless fashion.

The server computer 205 depicted in FIG. 2 may be implemented using one or more servers operating in response to a computer program stored in a storage medium accessible by the server computer 205. The server computer 205 may operate as a network server (e.g., a web server) to communicate with the peripheral devices 201 and 202. The server computer 205 handles sending and receiving information to and from the peripheral devices 201 and 202 and can perform associated tasks. The server computer 205 may also include firewalls to prevent unauthorized access and enforce any limitations on authorized access. For instance, an administrator may have access to the entire system and have authority to modify portions of the system. A firewall may be implemented using conventional hardware and/or software as is known in the art.

The server computer 205 manages a messaging queue 207. The messaging queue 207 is a software entity embodied in the server computer 205 by means of computer program codes known to a person skilled in the art configured to perform below operations. The messaging queue 207 stores messages inbound from the messaging applications of the peripheral devices 201 and 202 until they are delivered to their destination. For example, the first peripheral device 201 may generate a message for delivery to the second peripheral device 202. The message may be received, via the communication network 206, by the server computer 205 and stored in the messaging queue 207 until it may be delivered to the second peripheral device 202.

FIG. 2 shows only two peripheral devices 201 and 202. Of course, according to embodiments of the present invention, the number of peripheral devices is not limited to two and the system may include any number of peripheral devices. As such, the messaging queue may store messages from any number of peripheral devices for delivery to any number of peripheral devices.

The messaging queue 207 may be of predetermined length. That is, the messaging queue 207 may be able store messages until the length is met. After this point, old messages may be rejected. As discussed above, to be able to handle burst traffic, the length of the messaging queue 207 must be relatively long and when the queue is full a significant amount of memory may be consumed by the messages. This may lead to the attendant problems described above. The server computer 205 may also include multiple messaging queues.

According to an embodiment, the server computer 205 determines a duration for which each message, received by it for transmitting it to their destinations, can remain on the messaging queue. Determination of the duration for which each message can remain on the messaging queue 207 may be achieved by incorporating specific computer program codes within the server computer 205 known to a person skilled in the art. Typically, this determination may be performed before putting the incoming messages from the peripheral devices 201 and 202 onto the messaging queue 207.

Typically, a sender sending the message through a messaging application 203 or 204 from which the message is originating explicitly assigns a duration for which each message can remain on the messaging queue 207. If not, according to an embodiment, the server computer 205 assigns and subsequently determines the duration for which each message can remain on the messaging queue.

It shall be noted here that determining the duration for which the message can remain on the messaging queue 207 is intended to mean that the server computer 205 identifies or makes itself aware of the duration for which the message can remain on the messaging queue which is assigned by either the messaging application 203 or 204 or the server computer 205 itself.

The determined duration for which each message can remain on the messaging queue 207 may be stored by the server computer 205 within the message or separately.

After a newly received message whose duration for which it can remain on the messaging queue 207 has been determined and is put onto the messaging queue 207, the server computer 205, at regular pre-determined intervals monitors an age of each message on the messaging queue 207. According to an embodiment, the server computer may initiate a clock counter as soon as the message is put onto the messaging queue 207 and at regular interval read the clock counter. This may be achieved by executing computer program codes known to a person skilled in the art.

The age of each message on the messaging queue 207 is compared with the duration for which each message can remain on the messaging queue 207. If the age of a message on the messaging queue 207 exceeds the duration for which it can remain on the messaging queue as determined by the server computer 205, a notification or alert is generated and sent to the system administrator of the server computer 205 of the asynchronous messaging system to enable him to take appropriate action or to a monitoring application for monitoring the messaging queue 207.

Figure 3:
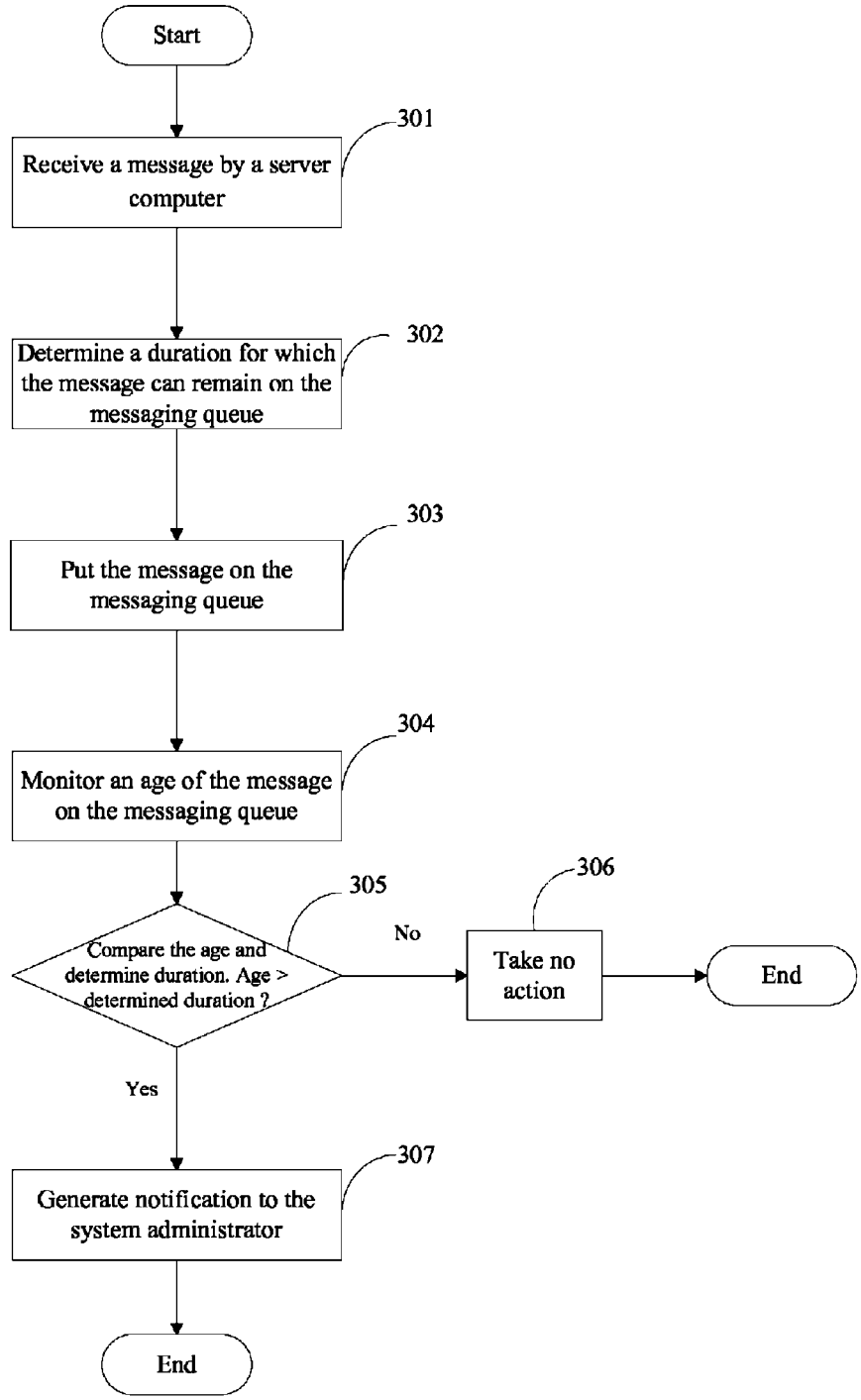
FIG. 3 illustrates a flowchart depicting steps to be performed for implementing an embodiment of the present invention.

FIG. 3 illustrates flowcharts depicting steps to be performed for implementing an embodiment of the present invention. At step 301, a message is received on a server computer from a messaging application of a peripheral device to be transmitted to a messaging application of one or more other peripheral devices. Each peripheral device may be implemented using a general-purpose computer device as shown in FIG. 1 executing a computer program for carrying out the processes described herein. The peripheral devices may be a personal computer (e.g., a laptop, a personal digital assistant) or a host attached terminal. The peripheral devices are not limited to being personal computers and may be any device capable of creating a message to be transferred to another device. Further examples of such devices include sensors that report data. The peripheral devices may be coupled to each other and to a server computer via a communications network. The communications network may be any type of known network including, but not limited to, a wide area network (WAN), a public switched telephone network (PSTN) a local area network (LAN), a global network (e.g. Internet), a virtual private network (VPN), and an intranet. The communications network may be implemented using a wireless network or any kind of physical network implementation known in the art. Peripheral devices and may be coupled to the server computer through multiple networks (e.g., intranet and Internet) so that not all user systems are coupled to the host systems through the same network. One or more user systems and the server computer may be connected to the network in a wireless fashion. The server computer may be implemented using one or more servers operating in response to a computer program stored in a storage medium accessible by the server computer. The server computer may operate as a network server (e.g., a web server) to communicate with the peripheral devices. The server computer handles sending and receiving information to and from the peripheral devices and can perform associated tasks. The server computer may also include firewalls to prevent unauthorized access and enforce any limitations on authorized access. For instance, an administrator may have access to the entire system and have authority to modify portions of the system. A firewall may be implemented using conventional hardware and/or software as is known in the art.

The server computer manages a messaging queue. The messaging queue stores messages inbound from the messaging applications of the peripheral devices until they are delivered to their destination. For example, the first peripheral device may generate a message for delivery to the second peripheral device. The message may be received, via the communications network, by the server computer and stored in the messaging queue until it is delivered to the second peripheral device. The messaging queue may be of predetermined length. That is, the messaging queue may be able store messages until the length is met. After this point, old messages may be rejected. As discussed above, to be able to handle burst traffic, the length of the messaging queue must be relatively long and when the queue is full a significant amount of memory may be consumed by the messages. This may lead to the attendant problems described above. The system may also include multiple messaging queues.

At step 302, the server computer determines a duration for which the received message can remain on the messaging queue. Determination of the duration for which the message can remain on the messaging queue may be achieved by incorporating specific computer program codes within the server computer known to a person skilled in the art. Typically, this determination may be performed before putting the incoming message onto the messaging queue. Typically, a sender sending the message through a messaging application from which the message is originating explicitly assigns a duration for which each message can remain on the messaging queue. If not, the server computer assigns and subsequently determines the duration for which each message can remain on the messaging queue.

It shall be noted here that determining the duration fir which the message can remain on the messaging queue is intended to mean that the server computer identifies or makes itself aware of the duration for which the message can remain on the messaging queue which is assigned by either the messaging application or the server computer itself.

The determined duration of time for which each message in the messaging queue may be stored by the server computer within the message or separately.

At step 303, the message whose duration for which it can remain on the messaging queue is determined is put onto the messaging queue. At step 304, the server computer, at regular pre-determined intervals monitors an age of the message on the queue. According to an embodiment, the server computer may initiate a clock counter as soon as the message is put onto the messaging queue and at regular interval read the clock counter. This may be achieved by executing computer program codes known to a person skilled in the art.

At step 305, the age of a message on the messaging queue is compared with the determined duration for which it can remain on the messaging queue and determine if the age of the message on the queue is greater or equal to the determined duration for which the message can remain on the messaging queue. At step 306, (NO branch of step 305), if the age of a message is less than the determined duration for which each message can remain on the messaging queue, no action is taken. At step 307 (YES branch of step 305), if the age of a message is more than or equal to the determined duration for which the message can remain on the messaging queue, a notification is generated which may be delivered to a system administrator of the server computer to enable him to take relevant actions, or is delivered to a monitoring application of the messaging queue.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a messaging queue in an asynchronous messaging system, the method comprising:
    receiving, by a network server, a message, wherein the message is generated by sensors, and wherein the message includes data generated by the sensors;
    determining a duration for which the message can remain on a messaging queue in the network server;
    placing, by the network server, the message on the messaging queue, wherein determining the duration for which the message can remain on the messaging queue is performed before the message is put onto the messaging queue;
    storing, by the network server, the determined duration on the network server separately from the message;
    monitoring, by one or more processors, an age of the message on the messaging queue;
    comparing, by one or more processors, the determined duration and the age of the message on the messaging queue; and
    generating, by one or more processors, a notification that describes a result of said comparing.

2. The method of claim 1, wherein the duration for which the message can remain on the messaging queue is assigned by a sender of the message through a messaging application from which the message originated, the assigned duration being subsequently determined by a server computer managing the messaging queue.

3. The method of claim 1, wherein the duration for which the message can remain on the messaging queue is assigned and subsequently determined by a server computer managing the messaging queue.

4. The method of claim 1, wherein the generated notification is delivered to a system administrator of a server computer managing the messaging queue.

5. The method of claim 1, wherein the generated notification is delivered to a monitoring application monitoring the messaging queue.

6. A system implemented in a hardware for managing a messaging queue in an asynchronous messaging system, the system comprising a computer infrastructure operable to:
   receive, by a network server, a message, wherein the message is generated by sensors, and wherein the message includes data generated by the sensors;
   determine a duration for which the message can remain on a messaging queue in the network server;
   place, by the network server, the message on the messaging queue, wherein determining the duration for which the message can remain on the messaging queue is performed before the message is put onto the messaging queue;
   store, by the network server, the determined duration on the network server separately from the message;
   monitor an age of the message on the messaging queue;
   compare the determined duration and the age of the message on the messaging queue; and
   based on said comparison, generate a notification.

7. The system of claim 6, wherein the computer infrastructure to determine the duration for which the message can remain on the messaging queue is assigned by a sender of the message through a messaging application from which the message originated.

8. The system of claim 6, wherein the computer infrastructure is operable to assign and subsequently determine the duration for which the message can remain on the messaging queue.

9. The system of claim 6, wherein the computer infrastructure is operable to deliver the generated notification to a system administrator of the computer infrastructure.

10. The system of claim 6, wherein the computer infrastructure is operable to deliver the generated notification to a monitoring application monitoring the messaging queue.

11. A computer program product for managing a messaging queue in an asynchronous messaging system, the computer program product comprising a non-transitory computer readable storage medium having program code embodied therewith, the program code readable and executable by a processor to perform a method comprising:
   receiving, by a network server, a message, wherein the message is generated by sensors, and wherein the message includes data generated by the sensors;
   determining a duration for which the message can remain on a messaging queue of an asynchronous messaging system;
   placing, by the network server, the message on the messaging queue, wherein determining the duration for which the message can remain on the messaging queue is performed before the message is put onto the messaging queue;
   storing, by the network server, the determined duration on the network server separately from the message;
   monitoring an age of the message on the messaging queue;
   comparing the determined duration and age of the message on the messaging queue; and
   generating a notification that describes a result of said comparing.

12. The computer program product of claim 11, wherein the duration for which the message can remain on the messaging queue is assigned by a sender of the message through a messaging application from which the message originated, the assigned duration being subsequently determined by a server computer managing the messaging queue.

13. The computer program product of claim 11, wherein the duration for which the message can remain on the messaging queue is assigned and subsequently determined by a server computer managing the messaging queue.

14. The computer program product of claim 11, wherein the generated notification is delivered to a system administrator of a server computer managing the messaging queue.

15. The computer program product of claim 11, wherein the generated notification is delivered to a monitoring application monitoring the messaging queue.

\* \* \* \* \*